United States Patent
Emslander et al.

(10) Patent No.: US 10,987,894 B2
(45) Date of Patent: Apr. 27, 2021

(54) ARTICLE COMPRISING MULTILAYER FILM

(71) Applicant: 3M INNOVATIVE PROPERTIES COMPANY, St. Paul, MN (US)

(72) Inventors: Jeffrey O. Emslander, City of Grant, MN (US); Jacob D. Young, St. Paul, MN (US); George J. Clements, Afton, MN (US); Christopher J. Rother, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 46 days.

(21) Appl. No.: 16/463,916

(22) PCT Filed: Dec. 4, 2017

(86) PCT No.: PCT/US2017/064401
§ 371 (c)(1),
(2) Date: May 24, 2019

(87) PCT Pub. No.: WO2018/106560
PCT Pub. Date: Jun. 14, 2018

(65) Prior Publication Data
US 2019/0375184 A1    Dec. 12, 2019

Related U.S. Application Data

(60) Provisional application No. 62/432,337, filed on Dec. 9, 2016.

(51) Int. Cl.
*B32B 5/18* (2006.01)
*B29C 48/335* (2019.01)
(Continued)

(52) U.S. Cl.
CPC ............ *B32B 5/18* (2013.01); *B29C 48/0018* (2019.02); *B29C 48/0022* (2019.02);
(Continued)

(58) Field of Classification Search
CPC ........ B32B 5/18; B29C 48/23; B29C 48/0022
See application file for complete search history.

(56) References Cited

U.S. PATENT DOCUMENTS

| 4,379,806 A | 4/1983 | Korpman |
| 5,217,666 A | 6/1993 | Tamaru |

(Continued)

FOREIGN PATENT DOCUMENTS

| CN | 2295252 | 10/1998 |
| CN | 104640954 | 1/2002 |

(Continued)

OTHER PUBLICATIONS

International Search Report for PCT International Application No. PCT/US2017/064396, dated Jan. 30, 2018, 4 pages.

(Continued)

*Primary Examiner* — Chinessa T. Golden

(57) ABSTRACT

Article comprising first and second continuous polymeric layers having at least one polymeric layer exhibiting a random network of strands and connective regions disposed between the first and second continuous polymeric layers. In some embodiments, the article is a tape and polymeric multilayer film having a slip resistant surface.

6 Claims, 5 Drawing Sheets

(51) Int. Cl.
    *B29C 48/21* (2019.01)
    *B29C 48/00* (2019.01)
    *B32B 5/14* (2006.01)
    *B32B 7/06* (2019.01)
    *B32B 27/06* (2006.01)
    *B32B 27/08* (2006.01)
    *B32B 27/30* (2006.01)
    *B32B 27/32* (2006.01)
    *B29C 48/23* (2019.01)
    *B29C 48/10* (2019.01)
    *B29L 23/00* (2006.01)

(52) U.S. Cl.
    CPC .............. *B29C 48/21* (2019.02); *B29C 48/23* (2019.02); *B29C 48/3366* (2019.02); *B32B 5/142* (2013.01); *B32B 7/06* (2013.01); *B32B 27/065* (2013.01); *B32B 27/08* (2013.01); *B32B 27/302* (2013.01); *B32B 27/306* (2013.01); *B32B 27/32* (2013.01); *B29C 48/10* (2019.02); *B29L 2023/001* (2013.01); *B32B 2250/05* (2013.01); *B32B 2250/24* (2013.01); *B32B 2264/105* (2013.01); *B32B 2266/025* (2013.01); *B32B 2270/00* (2013.01); *B32B 2307/21* (2013.01); *B32B 2307/306* (2013.01); *B32B 2307/409* (2013.01); *B32B 2307/4023* (2013.01); *B32B 2307/4026* (2013.01); *B32B 2307/58* (2013.01); *B32B 2307/5825* (2013.01); *B32B 2307/746* (2013.01); *B32B 2307/748* (2013.01); *B32B 2451/00* (2013.01)

(56) References Cited

U.S. PATENT DOCUMENTS

| | | | |
|---|---|---|---|
| 6,171,689 | B1 | 1/2001 | Kaytor |
| 6,316,120 | B1 | 11/2001 | Emslander |
| 6,777,053 | B1 | 8/2004 | Guenter |
| 6,921,729 | B2 | 7/2005 | Schwab |
| 8,480,836 | B2 | 7/2013 | Orlych |
| 8,563,621 | B2 | 10/2013 | Lapierre |
| 8,632,706 | B2 | 1/2014 | Orlych |
| 8,865,038 | B2 | 10/2014 | Orlych |
| 9,028,732 | B2 | 5/2015 | Sullivan |
| 9,187,678 | B2 | 11/2015 | Boardman |
| 10,626,268 | B2 | 4/2020 | Satrijo |
| 2001/0034173 | A1 | 10/2001 | Zimmermann |
| 2005/0056973 | A1 | 3/2005 | Ooyama |
| 2007/0184259 | A1* | 8/2007 | Brunner .................. B32B 7/02 428/318.4 |
| 2009/0186183 | A1 | 7/2009 | Michel |
| 2011/0008609 | A1 | 1/2011 | Bacino |
| 2012/0028524 | A1 | 2/2012 | Peloquin |
| 2012/0064273 | A1 | 3/2012 | Bacino |
| 2012/0070661 | A1 | 3/2012 | Ikishima |
| 2012/0172214 | A1 | 7/2012 | Thomas |
| 2013/0324651 | A1 | 12/2013 | Joly |
| 2016/0059515 | A1 | 3/2016 | Perick |
| 2016/0082621 | A1 | 3/2016 | Li |
| 2019/0375173 | A1 | 12/2019 | Young |
| 2019/0375186 | A1 | 12/2019 | Emslander |
| 2019/0375188 | A1 | 12/2019 | Young |
| 2019/0389173 | A1 | 12/2019 | Tsoupikov |

FOREIGN PATENT DOCUMENTS

| | | |
|---|---|---|
| CN | 1437527 | 8/2003 |
| CN | 102085736 | 6/2011 |
| CN | 103180035 | 6/2013 |
| EP | 2535388 | 12/2012 |
| JP | 2013124279 A | 6/2013 |
| WO | WO 1999-014264 | 3/1999 |
| WO | WO 2000-042095 | 7/2000 |
| WO | WO 02-00412 | 1/2002 |
| WO | WO 2005-068177 | 7/2005 |
| WO | WO 2007-087281 | 8/2007 |
| WO | WO 2014-100551 | 6/2014 |
| WO | WO 2014-100580 | 6/2014 |
| WO | WO 2014-199268 | 12/2014 |
| WO | WO 2015-200655 | 12/2015 |
| WO | WO 2015-200657 | 12/2015 |
| WO | WO 2015-200669 | 12/2015 |
| WO | WO 2015200743 A1 | 12/2015 |
| WO | WO 2016-137793 | 9/2016 |
| WO | WO 2018-106557 | 6/2018 |
| WO | WO 2018-106558 | 6/2018 |
| WO | WO 2018-106559 | 6/2018 |
| WO | WO 2018-106561 | 6/2018 |

OTHER PUBLICATIONS

International Search Report for PCT International Application No. PCT/US2017/064398, dated Jan. 26, 2018, 4 pages.
International Search Report for PCT International Application No. PCT/US2017/064400, dated Mar. 27, 2018, 4 pages.
International Search Report for PCT International Application No. PCT/US2017/064401, dated Feb. 14, 2018, 5 pages.
International Search Report for PCT International Application No. PCT/US2017/064403, dated Jan. 30, 2018, 4 pages.

* cited by examiner

ARTICLE COMPRISING MULTILAYER FILM

CROSS REFERENCE TO RELATED APPLICATIONS

This application is a national stage filing under 35 U.S.C. 371 of PCT/US2017/064,401, filed Dec. 4, 2017, which claims the benefit of U.S. Provisional Application No. 62/432,337, filed Dec. 9, 2016, the disclosure of which is incorporated by reference in its/their entirety herein.

BACKGROUND

There is a desire to make polymeric films and film composites with structures and/or textures to provide additional functionality. Such functionality may include optical effects, and/or increased liquid absorption or solid retention due to the increased surface area of a texture surface vs. a smooth surface.

Textures or structures can be added to polymeric films, for example, via casting molten polymer onto a patterned chill roll. This requires the use of a specific patterned roll for each desired texture or structured film. Alternatively, a non-patterned polymeric film can be embossed after the film-making process by reheating at least a portion of the film surface and passing between a high-pressure nip with at least one of the rollers having the reverse of the desired pattern. This technique requires an additional process step and requires the manufacture and use of a patterned roll for each desired final texture or structure.

Textured films can also be produced by coating or laminating a polymeric layer onto a nonwoven web. The nonwoven layer provides the desired texture or structure while the film layer provides other functionality such as a barrier or decorative layer. This process requires multiple process steps to produce the desired end product—producing a non-woven web and at least a second step to provide the lamination or coating of the polymer layer onto the nonwoven.

There remains a need to produce a structured and/or textured polymeric film or film composite that can be produced without the need for unique patterned rolls or without the need for a secondary process to produce the texture or structure.

SUMMARY

The present disclosure describes an article comprising first and second continuous polymeric layers having at least one polymeric layer (in some embodiments, at least 2, 3, 4, 5, 6, or even at least 7 polymeric layers each) exhibiting a random network of strands (in some embodiments, elongated strands) and connective regions (the random network has a first optical density and the connective regions has a second optical density, wherein the first optical density is greater than the second optical density; in some embodiments, there are openings in at least some of the connective regions, whereas in some embodiments there are no openings (i.e., no through holes) in the layer) disposed between the first and second continuous polymeric layers. In some embodiments, all or some of the additional polymeric layers, each exhibiting a random network of strands and connective regions, are adjacent another layer exhibiting a random network of strands and connective regions. In some embodiments, the article is a polymeric multilayer film.

Embodiments of articles described herein are useful, for example, as tapes and polymeric multilayer films having a slip resistant surface.

DETAILED DESCRIPTION

The present disclosure describes an article comprising first and second continuous polymeric layers having at least one polymeric layer (in some embodiments, at least 2, 3, 4, 5, 6, or even at least 7 polymeric layers each) exhibiting a random network of strands (in some embodiments, elongated strands) and connective regions (the random network has a first optical density and the connective regions has a second optical density, wherein the first optical density is greater than the second optical density; in some embodiments, there are openings in at least some of the connective regions, whereas in some embodiments there are no openings (i.e., no through holes) in the layer) disposed between the first and second continuous polymeric layers. In some embodiments, all or some of the additional polymeric layers, each exhibiting a random network of strands and connective regions, are adjacent another layer exhibiting a random network of strands and connective regions. In some embodiments, the article is a polymeric multilayer film.

Figure 1:
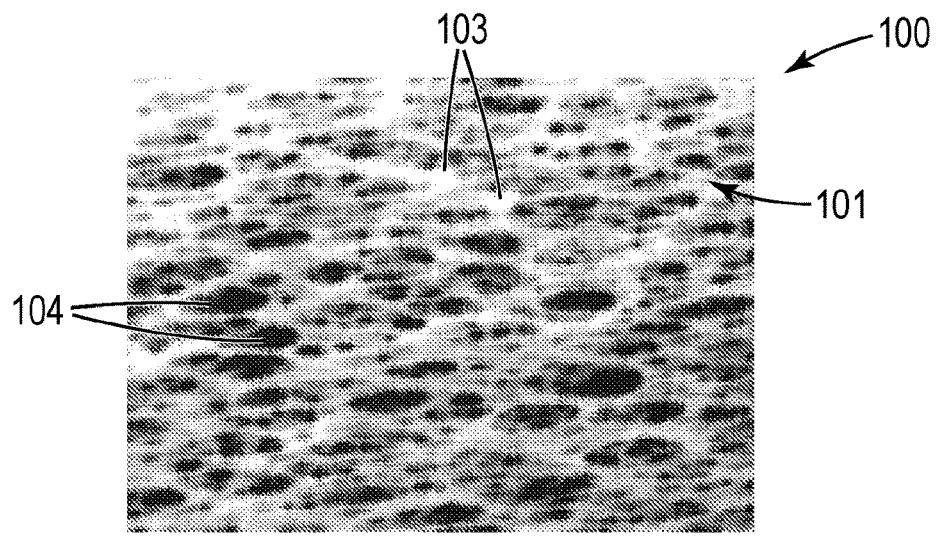
FIG. 1 is a cross-section schematic of an exemplary article described herein.
Figure 1A:
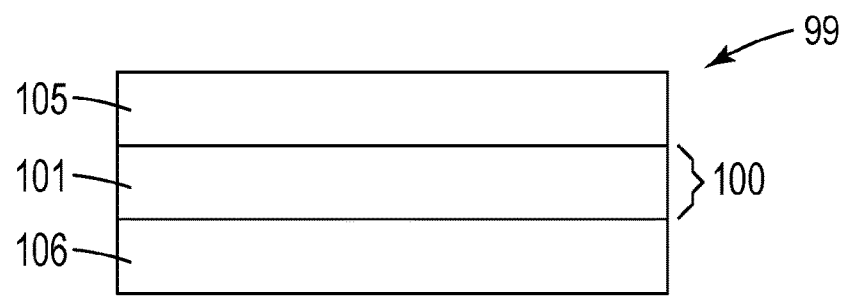
FIG. 1A is a side view of an exemplary article described herein with the exemplary polymeric multilayer film shown in FIG. 1.

Referring to FIGS. 1 and 1A, exemplary article 99 has exemplary polymeric multilayer film 100 disposed between first and second continuous polymeric layers 105 and 106, respectively. Polymeric multilayer film 100 has layer 101 exhibiting random network of strands 103 and connective regions 104. Continuous layer 105 not shown in FIG. 1 in order to see layer 101. Also, only layer 101 of polymeric multilayer film 100 is shown.

Figure 2:
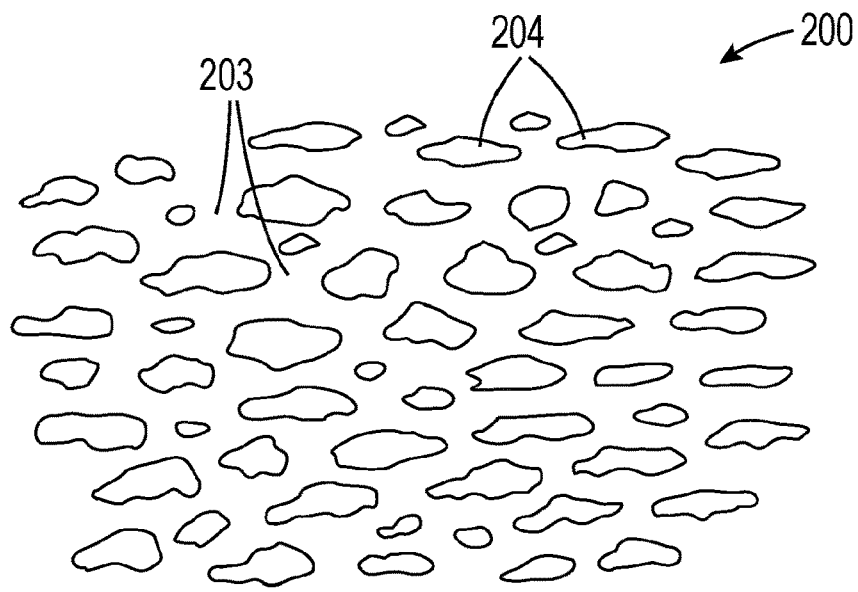
FIG. 2 is a top view schematic of another exemplary random network of strands and connective regions.

Referring to FIG. 2, another example of random network of strands 203 and connective regions 204 is shown.

In some embodiments, a layer exhibiting a random network of strands and connective regions, as well as other layers, independently comprise at least one of a polyolefinic material (e.g., polypropylene and/or polyethylene), modified polyolefinic material, polyvinyl chloride, polycarbonate, polystyrene, polyester (including co-polyester), polylactide, polyvinylidene fluoride, (meth)acrylic (e.g., polymethyl methacrylate), urethane, acrylic urethane, ethylene vinyl acetate copolymer, acrylate-modified ethylene vinyl acetate polymer, ethylene acrylic acid copolymers, nylon, engineering polymer (e.g., a polyketone and/or polymethylpentane), or elastomer (e.g., natural rubber; synthetic rubber; styrene block copolymer containing isoprene, butadiene, or ethylene (butylene) blocks; metallocene-catalyzed polyolefin, polyurethanes; or polydiorganosiloxane).

In some embodiments, a layer exhibiting a random network of strands and connective regions has an open porosity of at least 1 (in some embodiments, at least 5, 10, 15, 20, 25, 30, 35, 40, 45, 50, 55, 60, 65, 70, 75, or even at least 80; in some embodiments, in a range from 1 to 80) percent.

In general, polymeric multilayer films comprising at least one layer each exhibiting a random network of strands and connective regions described herein can be made by over-foaming a layer in a blown film process that uses an annular die to form a molten tube of film oriented radially via air pressure in a "bubble," and also pulled lengthwise in the molten area to thin the film to the final desired thickness. For example, referring to FIG. 3, apparatus for making polymeric multilayer film comprising at least two adjacent polymeric layers each exhibiting a random network of strands and connective regions described herein 300 includes hopper 304, extruder 306, annular die 308, air ring 310, collapsing frame 314, rollers 316A, 316B that form nip 317, slitting station 323 and idler rolls 318, 319. Referring to FIG. 3A, further details nine-layer annular die 308 are shown, including stacked die plates, with each individual die plate stack layer having machined polymer flow channels 309A, 309B, 309C, 309D, 309E, 309F, 309G, 309H, 309I. During the film making process, the molten polymer passes through the flow channels 309A, 309B, 309C, 309D, 309E, 309F, 309G, 309H, 309I and contacts central die cylinder 310 and then flows upward combining with other layers and exits annular die opening 311 to form multilayered film tube 312. The number of layers in the polymeric multilayer film can be adjusted by the number of stacking die plates in the annular die.

In operation, resin 302 (typically in the form of pellets) and other additives are added to hopper 304. Molten or otherwise flowable resin exits extruder 306 into annular die 308. Air ring 310 provides uniform air flow over the molten polymer bubble which stabilizes and aids in cooling of the polymer bubble forming circular film bubble 312 into a collapsed file tube 320 by passing through nip 317 formed by contacting nip rolls 316A and 316B. The collapsed film tube traverses idler rolls 318 and passes through slitting station 323 resulting in the formation of two flat films 320A and 320B that are passed over additional idler roll 319. Films 320A and 320B are then wound into individual rolls 321A and 321B, respectively. A layer(s) of the polymeric multilayer film can be foamed or overfoamed, for example, by introducing a gas into the molten polymer inside the extruder. The gas is readily absorbed into the polymer under the heat and pressure of the extrusion process. When the molten polymer exits the extrusion die, the absorbed, pressurized gas rapidly expands and forms voids. The proper process conditions can be adjusted so that when the polymer solidifies, the void structure is "locked in" resulting in a foam structure in the polymeric film.

Foaming of a layer(s) can be facilitated, for example, by including or injecting a foaming agent in the resin for that layer(s). Foaming agents are known in the art and include injecting gases, (e.g., nitrogen or carbon dioxide) into the molten polymer. Foaming agents are known in the art, and include a blend of alkaline earth metal carbonates and alkaline metal acid salts that is described in U.S. Pat. No. 8,563,621 (Lapierre), the disclosure of which is incorporated herein by reference. Exemplary commercially available blowing agents include those under the trade designation "ECOCELL H" from Polyfil Corp., Rockaway, N.J. Other exemplary chemical blowing agents for polymers are well known in the art and include hydrazine, hydrazide, and azodicarbonamide materials (e.g., 4,4'-oxybis (benzenesulfonyl hydrazide) (OBSH) (available, for example, in a masterbatch form under the trade designation "CELOGEN OT" from ChemPoint, Bellevue, Wash.). Another exemplary chemical blowing agent is an endothermic foaming agent, available as a masterbatch under the trade designation "FCX111263" from RTP Company, Winona, Minn.

In some embodiments, the forming agent is added to the resins that is fed into the extruder. The foaming agent and other processing conditions are selected or adjusted to provide a desired or acceptable polymeric multilayer film comprising a layer(s) exhibiting a random network of strands and connective regions.

In some embodiments, at least one layer of a polymeric multilayer film described herein comprises an ultraviolet (UV) absorber. A UV absorbing layer (e.g., a UV protective layer) can aid in protecting other layers or substrates from UV-light caused damage/degradation over time by absorbing UV-light (in some embodiments, any UV-light).

In some embodiments, the UV absorbers are red shifted UV absorbers (RUVA) that absorb at least 70% (in some embodiments, at least 80%, or even at least 90%) of the UV light in the wavelength region from 180 nm to 400 nm. Typically, it is desirable that the RUVA be highly soluble in polymers, highly absorptive, photo-permanent, and thermally stable in at least the temperature range from 200° C. to 300° C. for the extrusion process to form the protective layer. In some embodiments, a RUVA is copolymerizable with monomers to form a protective coating layer by at least one of free radical initiator curing, UV curing, gamma ray curing, e-beam curing, or thermal curing processes. Exemplary UVAs are UVA oligomers as described, for example, in PCT Pub. Nos. WO 2014/10055A1 (Olson et. al.), WO 2014/100580A1 (Olson et. al.), WO 2015/200655 (Olson et. al.), WO 2015/200669 (Olson et. al.), and WO 2015/200657 (Olson et. al.), the disclosure of which are incorporated herein by reference.

RUVAs typically have enhanced spectral coverage in the long-wave UV region (i.e., 300 nm to 400 nm), enabling them to block the high wavelength UV light that can cause yellowing in most polymers. Typical UV protective layers have thicknesses in a range from about 13 micrometers to 380 micrometers with a RUVA loading level in a range from about 2-10% by weight. Exemplary RUVAs include benzotriazole compound, 5-trifluoromethyl-2-(2-hydroxy-3-alpha-cumyl-5-tert-octylphenyl)-2H-benzotriazole (available under the trade designation "CGL-0139" from BASF Corporation, Florham, N.J.), benzotriazoles (e.g., 2-(2-hydroxy-3,5-di-alpha-cumylphehyl)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole), and 2(-4,6-diphenyl-1-3,5-triazin-2-yl)-5-hexyloxy-phenol. Additional commercially available RUVAs include those available from BASF Corporation under the trade designations "TINUVIN 1577," "TINUVIN 1600," and "TINUVIN 777." Other exemplary UV absorbers are available, for example, in a polymethylmethacrylate (PMMA) UVA masterbatch from Sukano Polymers Corporation, Duncan, S.C., under the trade designations "TA11-10 MB03."

In some embodiments, at least one layer of a polymeric multilayer film described herein comprises a hindered amine light stabilizer (HALS). Exemplary HALS include those available from BASF Corporation under the trade designations "CHIMASSORB 944" and "TINUVIN 123." Another exemplary HALS is available, for example, from BASF Corp., under the trade designation "TINUVIN 944."

In some embodiments, at least one layer of a polymeric multilayer film described herein comprises an antioxidant. Exemplary antioxidants include those available under the trade designations "IRGANOX 1010" and "ULTRANOX 626" from BASF Corporation.

In some embodiments, at least one layer of a polymeric multilayer film described herein comprises an antioxidant. Antioxidants can reduce or prevent degradation of the color development, and the physical and mechanical properties of the polymeric multilayer film. Exemplary antioxidant materials include those commercially available, for example, under the trade designations "CYANOX 1790" and "CYANOX 2777" from Cytec Solvay Group, Woodland Park, N.J.

In some embodiments, at least one layer of a polymeric multilayer film described herein comprises at least one antistatic material. Antistatic materials can, for example, reduce dust and dirt attraction to finished products, reduce sparks through discharges, reduce ignition of flammable liquid and gas, reduce damage to electronic microcircuits, and reduce jamming of transport equipment. Exemplary antistatic materials include those available under the trade designations "CTASTAT 609" and "CYASTAT SN" from Cytec Solvay Group, Woodland Park, N.J.

In some embodiments, at least one layer of a polymeric multilayer film described herein comprises a release agent. Exemplary release agents include at least one of an alkyl dimethicone, a polyvinyl octadecyl carbamate, or an ethylene bis-stearamide. Alkyl dimethicones, are described, for example, in U.S. Pat. No. 9,187,678 (Boardman et al.). A polyvinyl octadecyl carbamate is commercially available, for example, under the trade designation "ESCOAT P-77" (a polyvinyl octadecyl carbamate in a linear, low density carrier resin) from Mayzo, Inc., Suwanee, Ga. An ethylene bis-stearamide is available, for example, under the trade designation "AMPACET 100666" from Ampacet Corporation, Tarrytown, N.Y. Pressure sensitive adhesive tapes, or adhesive tapes, are often provided in roll form, wherein the tape construction includes a backing, an adhesive layer on one major side of the backing, and a release layer on the other major side of the backing. The release layer allows the tape to be unwound from the roll at a controlled level. Other articles having release characteristics are employed in a variety of applications. Any adhesive coated article, including tapes, die-cut adhesive articles, and labels, require, as a matter of practicality, a release coating or a separate release liner. The release coating or liner provides a surface to which the article does not permanently adhere.

In some embodiments, at least one layer of a polymeric multilayer film described herein comprises at least one of a slip additive or blocking agent. Slip additives can modify the surface properties of a film, lowering the friction between film layers and other surfaces. To be effective the slip needs to migrate out of the polymer to the surface and therefore, it needs have a degree of incompatibility with the polymer.

Exemplary slip additives include fatty acid amides such as erucamide or oleamide. During processing, slip additives solubilize in the amorphous melt, but as the polymer cools and crystallizes, the fatty acid amide is "squeezed" out forming a lubricating layer at the polymer surface. The addition of a slip additive can reduce or prevent film sticking and pulling, helping to increase throughput. Exemplary slip additives are commercially available, for example, under the trade designations "AMPACET 100497" (a masterbatch containing 1% erucamide, in low density polyethylene carrier resin); and "#10358" (a masterbatch of 5% oleamide, in a polyethylene carrier) from Ampacet Corporation, Tarrytown, N.Y.

A blocking agent can reduce or prevent blocking of layers. Polyolefin and other plastic films have a tendency to adhere together, often making it difficult to separate layers. This adhesion between film layers, called blocking, is an inherent property of some polymers. Antiblocking additives can be added to the film to minimize this adhesion and lower the blocking force between layers. Once compounded into a plastic, these additives create a microrough surface, which reduces the adhesion between film layers and lowers the blocking tendency. Exemplary antiblock agents are typically inorganic materials such as diatomaceous earth, talc, calcium carbonate, clay, mica and ceramic spheres. An exemplary antiblock agent is commercially available, for example, under the trade designations "ABC5000" from Polyfil Corporation, Rockaway, N.J.; and "AMPACET 102077" from Ampacet Corp.

In some embodiments, at least one layer of a polymeric multilayer film described herein comprises an abrasion resistant material. Abrasion resistant materials may be added to reduce scratching, marring and abrasion of the finished product. An exemplary abrasion resistant additive is commercially available, for example, under the trade designation "MB25-381" (a masterbatch containing a siloxane polymer) from Dow Corning, Auburn Mich.

In some embodiments, at least one layer of a polymeric multilayer film described herein comprises at least one of a dye or pigment (e.g., imparting a color such as white, yellow, green, blue, red, orange, brown, black, etc.). Exemplary dyes include those commercially available, for example, under the trade designation "CLARIANT REMAFIN PE63421213-ZN" (a green dye masterbatch) from Clariant International AG, Muttenz, Switzerland. Exemplary pigments include titanium dioxide, zinc oxide, and zirconium dioxide. An exemplary pigment, commercially available masterbatch of titanium dioxide pigment in a polyolefin carrier, under the trade designation "#11937" from Standridge Color Corporation, Social Circle, Ga.

In some embodiments, at least one layer of a polymeric multilayer film described herein comprises at least one of an ink or paint receptive material. Ink receptive materials can be desirable for adding an informational or decorative element to a film to improve the functionality or aesthetics of the film. Exemplary receptive materials include, for example, ethylene/vinyl acetate/carbon monoxide terpolymer, as described, for example, in U.S. Pat. No. 6,316,120 (Emslander), the disclosure of which is incorporated herein by reference.

In some embodiments, at least one layer of a polymeric multilayer film described herein comprises metallic (e.g., aluminum, bronze, stainless steel, zinc, iron, tin, silver, gold, and/or titanium) particles. Metallic particles can provide unique decorative aspects, such as sparkle or pearlescence to films. An exemplary metallic particle additive is commercially available, for example, under the trade designation "PELLEX A240-50" (a metallic glitter masterbatch) from The Cary Company, Addison, Ill.

Exemplary continuous layers comprise at least one of a polyolefinic material (e.g., polypropylene and/or polyethylene), modified polyolefinic material, polyvinyl chloride, polycarbonate, polystyrene, polyester (including co-polyester), polylactide, polyvinylidene fluoride, (meth)acrylic (e.g., polymethyl methacrylate), urethane, acrylic urethane, ethylene vinyl acetate copolymer, acrylate-modified ethylene vinyl acetate polymer, ethylene acrylic acid copolymers, nylon, engineering polymer (e.g., a polyketone and/or polymethylpentane), or elastomer (e.g., natural rubber; synthetic rubber; styrene block copolymer containing isoprene, butadiene, or ethylene (butylene) blocks; metallocene-catalyzed polyolefin, polyurethanes; or polydiorganosiloxane). The continuous layers be a polymeric film made, for example, as described above, as well as provided by techniques known in the art, such as hot melt extrusion of an extrudable composition comprising the components of the continuous layer composition. Exemplary methods for making extrudable continuous layers are described, for example, in Progelhof, R. C., and Throne, J. L., "Polymer Engineering Principles," Hanser/Gardner Publications, Inc., Cincinnati, Ohio, 1993, the disclosure of which is incorporated herein by reference. In some embodiments, a continuous layer adjacent to a layer exhibiting a random network of strands and connective regions becomes textured from the random network of strands and connective regions (e.g., the continuous layer may conform at least in part to the texture of the random network of strands and connective regions).

Alternatively, for example, at least one layer may be extruded as a separate sheet and laminated together. In some embodiments, the substrate can advantageously combine the best properties of several resins in the various layers while minimizing the use of the most expensive resins, leading to a higher value and lower cost image receptor medium. For example, the substrate layer may be made with resins of generality low cost that can be chosen to provide specifically desired physical properties to the multilayered film. These properties may include dimensional stability, tear resistance, conformability, elastomeric properties, die cuttability, stiffness, and heat resistance.

In some embodiments comprising more than one layer exhibiting a random network of strands and connective regions, at least two such layers exhibit different random network of strands and connective regions.

In some embodiments, at least one (in some embodiments, each) of the first or second major surfaces of a polymeric multilayer film, described herein, has a coefficient of friction of at least 0.4 (in some embodiments, at least 0.5, 0.6, 0.7 or even at least 0.8; in some embodiments, in a range from 0.4 to 0.8). In some embodiments, at least one of the first or second major surfaces of a polymeric multilayer film, described herein, has a first and a second, different coefficient of friction. In some embodiments, the first major surface of a polymeric multilayer film, described herein, has a first and a second, different coefficient of friction and the second major surface of the polymeric multilayer film has a third and a fourth, different coefficient of friction. In some embodiments, the first and third coefficients of friction are the same, and in others, different; and the second and fourth coefficients of friction are the same, and in others, different. The coefficient of friction of a polymeric surface can be controlled or modified several ways. Coextrudable resins tend to have an inherent coefficient of friction, so changing the choice of extrudable resin can change the coefficient of friction. Polyethylene, for example, typically exhibits an increased coefficient when the density of the resin is decreased. The same effect typically occurs when ethylene is polymerized with, for example, a copolymer, butane, hexene, octenen, vinyl acetate, or methyl acrylate. The coefficient of friction can also be changed by using additives such as slip additives discussed above. The coefficient of friction can also be adjusted by an underlying layer exhibiting a random network of strands and connective regions.

In some embodiments, polymeric multilayer films, described herein, have a thickness in a range from 1 micrometer to 1000 micrometers (in some embodiments, in a range from 25 micrometers to 500 micrometers, 50 micrometers to 250 micrometers, or even 2 micrometers to 10 micrometers).

In some embodiments, polymeric multilayer films, described herein, have a machine and cross-machine direction, wherein the polymeric multilayer film is elastic in the cross-machine direction.

Embodiments of articles described herein include tapes and polymeric multilayer films having a slip resistant surface and a tape.

Exemplary Embodiments

1. An article comprising first and second continuous polymeric layers having at least one polymeric layer (in some embodiments, at least 2, 3, 4, 5, 6, or even at least 7 polymeric layers each) exhibiting a random network of strands (in some embodiments, elongated strands) and connective regions (the random network has a first optical density and the connective regions has a second optical density, wherein the first optical density is greater than the second optical density; in some embodiments, there are openings in at least some of the connective regions, whereas in some embodiments, there are no openings (i.e., no through holes) in the layer) disposed between the first and second continuous polymeric layers. In some embodiments, all or some of the polymeric additional layers, each exhibiting a random network of strands and connective regions, are adjacent another layer exhibiting a random network of strands and connective regions.

2. The article of Exemplary Embodiment 1, wherein the layers exhibiting a random network of strands and connective regions independently comprise at least one of a polyolefinic material (e.g., polypropylene and/or polyethylene), modified polyolefinic material, polyvinyl chloride, polycarbonate, polystyrene, polyester (including co-polyester), polylactide, polyvinylidene fluoride, (meth)acrylic (e.g., polymethyl methacrylate), urethane, acrylic urethane, ethylene vinyl acetate copolymer, acrylate-modified ethylene vinyl acetate polymer, ethylene acrylic acid copolymers, nylon, engineering polymer (e.g., a polyketone and/or polymethylpentane), or elastomer (e.g., natural rubber; synthetic rubber; styrene block copolymer containing isoprene, butadiene, or ethylene (butylene) blocks; metallocene-catalyzed polyolefin, polyurethanes; or polydiorganosiloxane).

3. The article of any preceding Exemplary Embodiment, wherein at least one layer exhibiting a random network of strands and connective regions has an open porosity of at least 1 (in some embodiments, at least 5, 10, 15, 20, 25, 30, 35, 40, 45, 50, 55, 60, 65, 70, 75, or even at least 80; in some embodiments, in a range from 1 to 80) percent.

4. The article of any preceding Exemplary Embodiment, wherein a layer exhibiting a random network of strands and connective regions is separable from the remaining polymeric multilayer film.

5. The article of any preceding Exemplary Embodiment, wherein the first and second continuous layers independently comprise at least one of a polyolefinic material (e.g., polypropylene and/or polyethylene), modified polyolefinic material, polyvinyl chloride, polycarbonate, polystyrene, polyester (including co-polyester), polylactide, polyvinylidene fluoride, (meth)acrylic (e.g., polymethyl methacrylate), urethane, acrylic urethane, ethylene vinyl acetate copolymer, acrylate-modified ethylene vinyl acetate polymer, ethylene acrylic acid copolymers, nylon, engineering polymer (e.g., a polyketone and/or polymethylpentane), or elastomer (e.g., natural rubber; synthetic rubber; styrene block copolymer containing isoprene, butadiene, or ethylene (butylene) blocks; metallocene-catalyzed polyolefin, polyurethanes; or polydiorganosiloxane)

6. The article of any preceding Exemplary Embodiment, wherein the first continuous layer is a skin layer.

7. The article of any preceding Exemplary Embodiment, further comprising a second layer exhibiting a random network of strands and connective regions.

8. The article of Exemplary Embodiment 7, wherein the second layer exhibiting a random network of strands and connective regions has a different a random network of strands and connective regions than the first layer comprising a random network of strands and connective regions.

9. The article of any preceding Exemplary Embodiment having a thickness in a range from 1 micrometer to 1000 micrometers (in some embodiments, in a range from 25 micrometers to 500 micrometers, 50 micrometers to 250 micrometers, or even 2 micrometers to 10 micrometers).

10. The article of any preceding Exemplary Embodiment, further comprising at least one of a die or pigment (e.g., imparting a color such as white, yellow, green, blue, red, orange, brown, black, etc.).

11. The article of any preceding Exemplary Embodiment, further comprising at least one antistatic material.

12. The article of any preceding Exemplary Embodiment, further comprising at least one of an ink or paint receptive material.

13. The article of any preceding Exemplary Embodiment, further comprising metallic (e.g., aluminum, bronze, stainless steel, zinc, iron, tin, silver, gold, and/or titanium) particles.

14. The article of any preceding Exemplary Embodiment, further comprising a release agent.

15. The article of any preceding Exemplary Embodiment, further comprising an abrasion resistant material.

16. The article of any preceding Exemplary Embodiment, further comprising at least one of a slip or antiblock agent.

17. The article of any preceding Exemplary Embodiment, further comprising a hinder amine light stabilizer (HALS).

18. The article of any preceding Exemplary Embodiment, further comprising an UV stabilizer.

19. The article of any preceding Exemplary Embodiment that is a polymeric multilayer film having a machine and cross-machine direction, wherein the polymeric multilayer film is elastic in the cross-machine direction.

20. The article of any preceding Exemplary Embodiment, further comprising a liner having a major surface attached to either the first or second major surface of the polymeric multilayer film. In some embodiments, each major surface of the polymeric multilayer film has a liner attached thereto.

21. The article of Exemplary Embodiment 20, wherein the liner comprises a polymeric multilayer film exhibiting a random network of strands and connective regions.

22. The article of any preceding Exemplary Embodiment, wherein at least one (in some embodiments, each) of the first or second major surfaces of a polymeric multilayer film described herein has a coefficient of friction of at least 0.4 (in some embodiments, at least 0.5, 0.6, 0.7 or even at least 0.8; in some embodiments, in a range from 0.4 to 0.8).

23. The article of any preceding Exemplary Embodiment that is a tape.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

Figure 3:
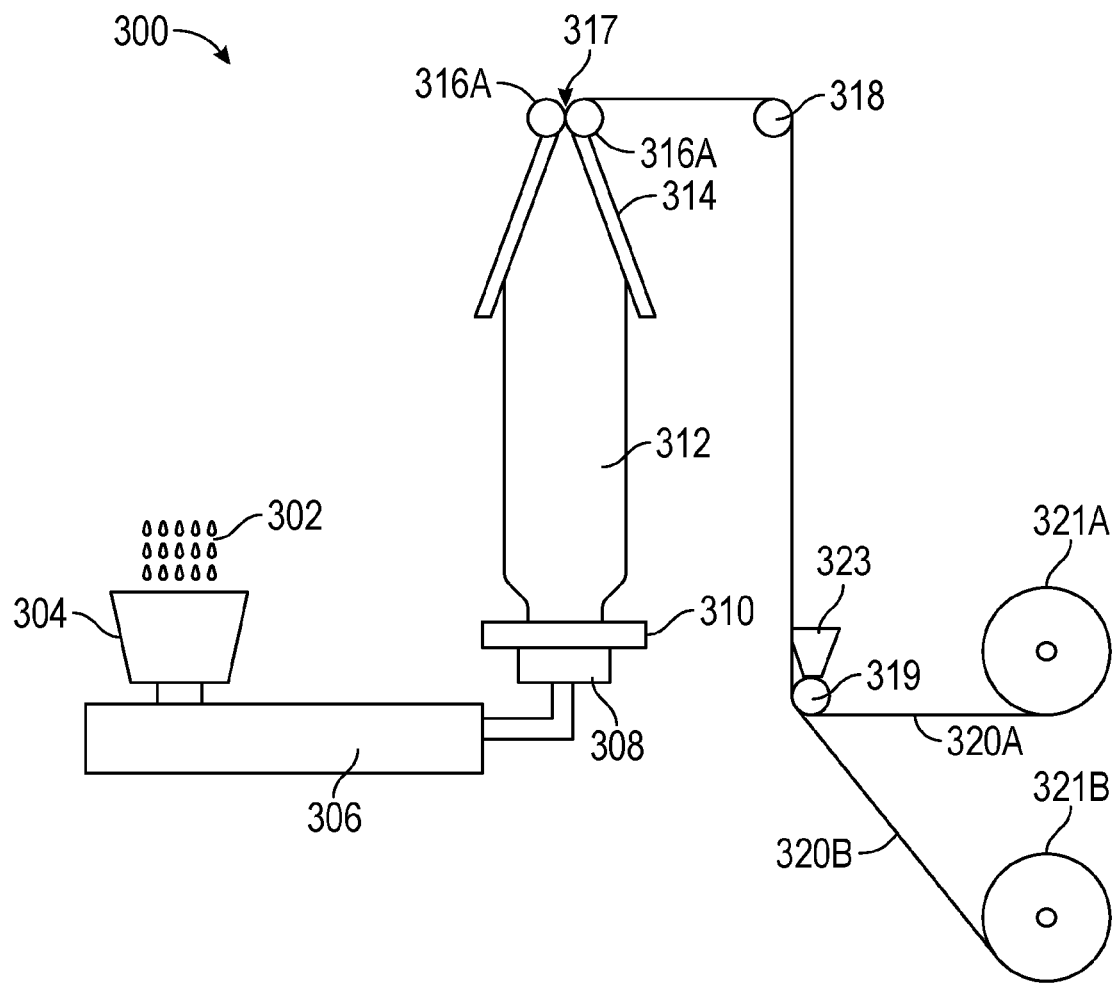
FIG. 3 is an exemplary apparatus for making polymeric multilayer film described herein.
Figure 3A:
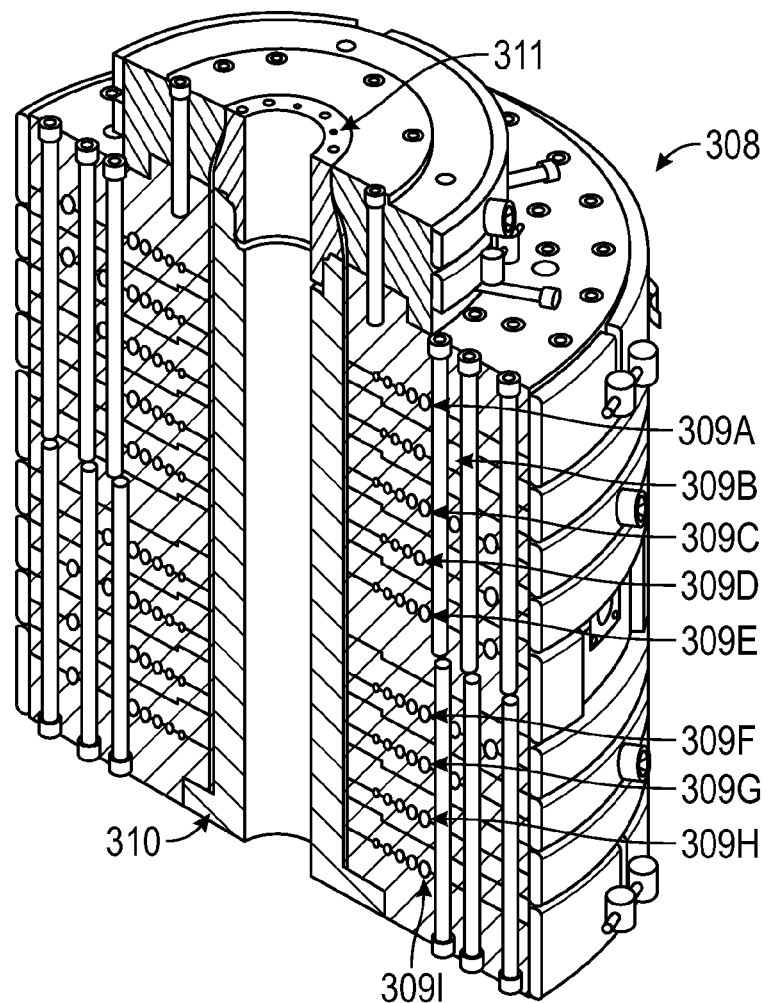
FIG. 3A is an exemplary annular die used in the apparatus shown in FIG. 3.

A seven-layer film was produced using a seven-layer annular stack die (obtained under the trade designation "COEX 7-LAYER" (Type LF-400) from Labtech Engineering, Samut Prakan, Thailand) using an apparatus as shown in FIGS. 3 and 3A, except there were only seven stacked die plates. Airflow to the die was manually controlled to achieve a blow-up ratio of about 2:1. The bubble was subsequently collapsed about 3 meters (10 feet) above die and rolled up. The feed materials were supplied by 7 independent 20 mm diameter extruders with about a 30:1 length to diameter ratio.

A first extruder was used to melt and extrude a low-density polyethylene (obtained under the trade designation "PETROTHENE NA217000 5.6 MFI" from LyondellBasell, Houston, Tex.) into an inside channel of the annular stack die. The melt temperature was maintained at 180° C. Second and third extruders were used to feed the same resin in subsequent outer layers of the first resin. A fourth extruder was used to feed a blend containing 96% of a thermoplastic polyolefin (obtained under the trade designation "ADFLEX X500F" from LyondellBasell, Houston, Tex.) with 4% of a chemical blowing agent (obtained under the trade designation "ECOCELL H" from Polyfil Corp., Rockaway, N.J.). A melt temperature of 215° C. was maintained. The fifth, sixth, and seventh extruders were used to feed the same low-density polyethylene resin to the outside layers of the annular stack die, each layer maintaining a temperature of 180° C. The die temperature was maintained at 180° C. A screw speed of 30 revolutions per minute was used.

Figure 4:
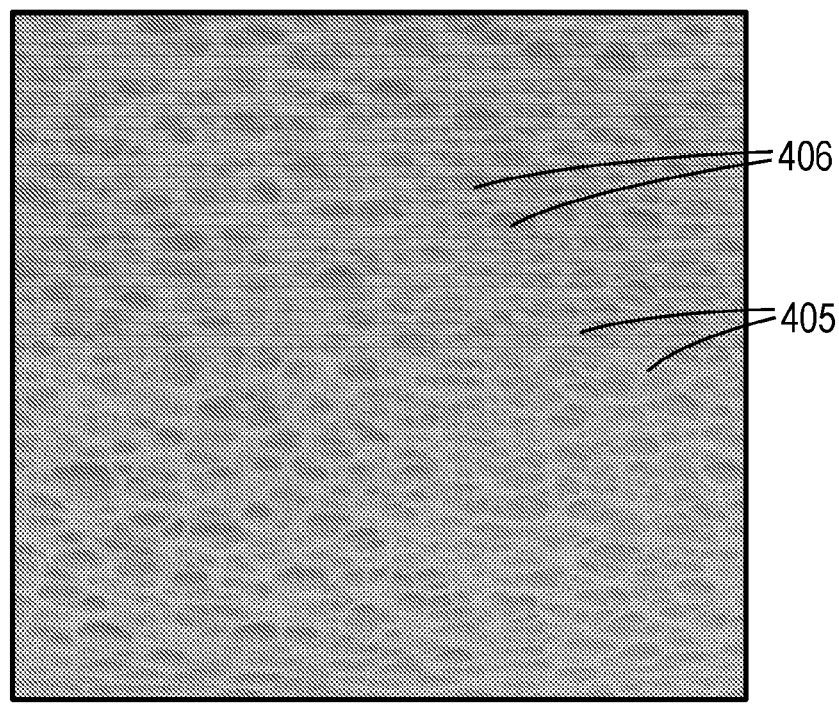
FIGS. 4 and 4A are optical images of Example 1 polymeric multilayer film.
Figure 4A:
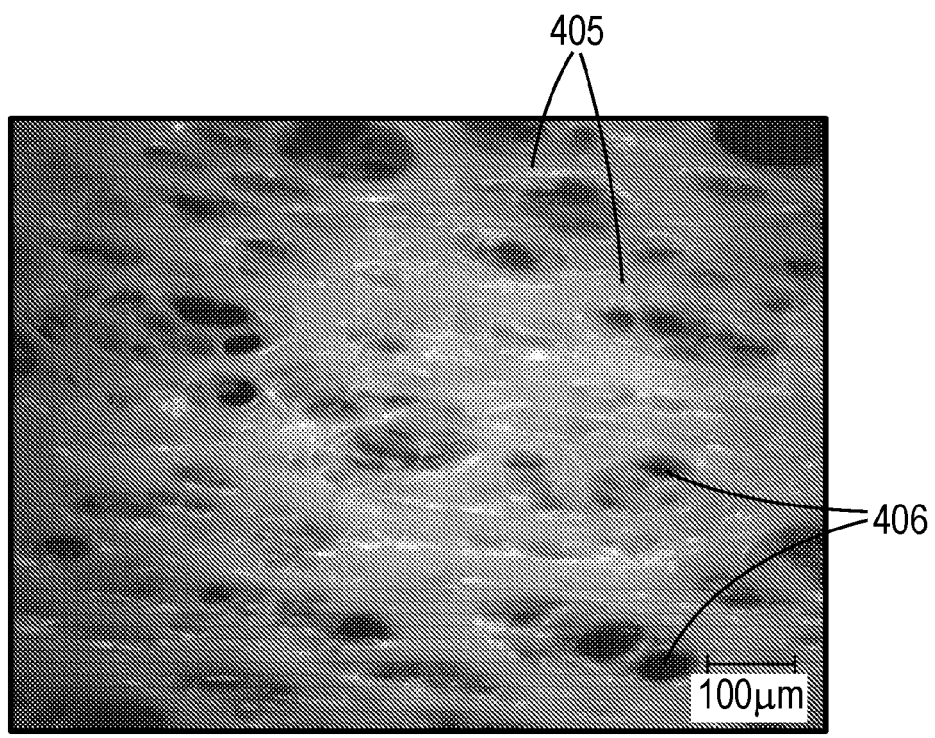

An image of the resulting polymeric multilayer film is shown in FIGS. 4 and 4A (see random network of strands 405 and connective regions 406).

Example 2

A polymeric multilayer film was prepared as described in Example 1, except the first, second, third, and fourth extruders contained only low-density polyethylene; the fifth extruder contained a blend of the same chemical blowing agent with a styrene ethylene butylene styrene (SEBS) copolymer (obtained under the trade designation "KRATON G 1657" from PolyOne, Avon Lake, Ohio); and the sixth and seventh extruders contained an ethylene vinyl acetate copolymer (obtained under the trade designation "WESTLAKE EF446" from Westlake Chemical Corporation, Houston, Tex.). For the layer containing a chemical blowing agent, a melt temperature of 215° C. was maintained. For all other layers, a melt temperature of 180° C. was maintained. The die was maintained at 180° C.

Figure 5:
FIGS. 5 and 5A are optical images of Example 2 polymeric multilayer film.
Figure 5A:
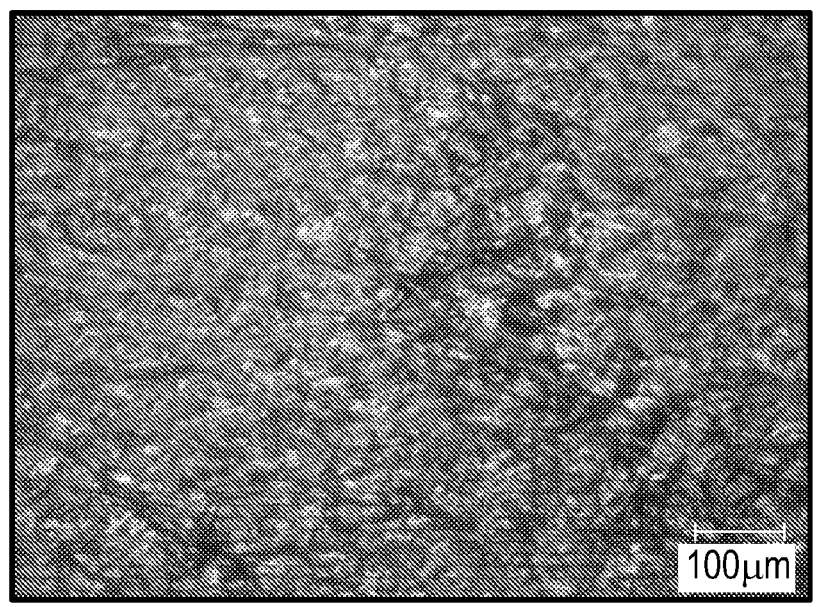

Images of the resulting polymeric multilayer film are shown in FIGS. 5 and 5A.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An article comprising a first continuous polymeric layer, a second continuous polymeric layer, and a polymeric multilayer film disposed between the first continuous polymeric layer and the second continuous polymeric layer, wherein the polymeric multilayer film comprises a plurality of blown polymeric film layers each exhibiting a random network of strands and connective regions, wherein the random network of strands has a first optical density and the connective regions have a second optical density, and wherein the first optical density is greater than the second optical density.

2. The article of claim 1, wherein at least one polymeric layer in the plurality of blown polymeric film layers has an open porosity of at least 20 percent.

3. The article of claim 1, wherein at least one polymeric layer in the plurality of blown polymeric film layers is separable from a remainder of the polymeric multilayer film.

4. The article of claim 1, wherein at least one of a first major surface or a second major surface of the polymeric multilayer film has a coefficient of friction of at least 0.4.

5. The article of claim 1 that is a graphic article.

6. The article of claim 1 that is a tape.

* * * * *